US011802001B2

United States Patent
Ohlhaeuser et al.

(10) Patent No.: US 11,802,001 B2
(45) Date of Patent: Oct. 31, 2023

(54) RUBBERIZED TEXTILE MATERIAL FOR A BELT PLY, ASSOCIATED RUBBER MIXTURE AND BELT

(71) Applicant: Arntz Beteiligungs GmbH & Co. KG, Hoexter (DE)

(72) Inventors: Rudolf Ohlhaeuser, Nieheim (DE); Michael Schaeper, Paderborn (DE); Jens-Thomas Ahlemann, Boffzen (DE)

(73) Assignee: ARNTZ BETEILUNGS GMBH & CO. KG, Hoexter (DE)

( * ) Notice: Subject to any disclaimer, the term of this patent is extended or adjusted under 35 U.S.C. 154(b) by 0 days.

(21) Appl. No.: 16/131,160

(22) Filed: Sep. 14, 2018

(65) Prior Publication Data
US 2019/0077932 A1 Mar. 14, 2019

(30) Foreign Application Priority Data
Sep. 14, 2017 (DE) .................... 10 2017 121 303.1

(51) Int. Cl.
*B65G 15/32* (2006.01)
*B65G 15/00* (2006.01)
(Continued)

(52) U.S. Cl.
CPC ............. *B65G 15/32* (2013.01); *B65G 15/00* (2013.01); *C08J 5/249* (2021.05); *C08L 23/16* (2013.01);
(Continued)

(58) Field of Classification Search
CPC ...... C08J 5/24; C08J 2491/00; C08J 2471/10; C08J 2323/16; B65G 15/00; B65G 15/32;
(Continued)

(56) References Cited

U.S. PATENT DOCUMENTS 3,476,642 A 11/1969 Berg et al.
4,205,559 A 6/1980 Long et al.
(Continued)

FOREIGN PATENT DOCUMENTS

DE 36 04 744 A1 10/1986
DE 100 52 287 A1 4/2002
(Continued)

OTHER PUBLICATIONS

"Gummi", Wikipedia, accessed Mar. 6, 2018, web.
"Asphalt," Wikipedia, accessed Apr. 3, 2018, web.

Primary Examiner — Michael Zhang
(74) Attorney, Agent, or Firm — WCF IP

(57) ABSTRACT

The rubberized textile material for a belt textile ply is provided on at least one side of a textile web with a peroxidically crosslinkable ethylene-alpha-olefin-diene terpolymer rubber mixture, preferably an EPDM mixture. In this rubberization mixture the third monomer content (diene content) of the EPDM is preferably at least 4% and the rubber mixture contains: a peroxidic crosslinker, a mineral oil having an aromatics proportion of at least 50 percent by weight and at least one reactive phenol and/or reactive phenol resin capable of binding to the double bonds of unsaturated polymers. The reactive phenol and/or phenol resin and the mineral oil are present in the rubber mixture in a content of altogether 5 to 60 phr. The rubberization has an exceptional manufacturing tack coupled with good adhesion and good dynamic properties.

14 Claims, 2 Drawing Sheets

(51) Int. Cl.
*C08J 5/24* (2006.01)
*C08L 23/16* (2006.01)

(52) U.S. Cl.
CPC ........ *C08J 2323/16* (2013.01); *C08J 2471/10* (2013.01); *C08J 2491/00* (2013.01); *C08L 2205/035* (2013.01); *C08L 2312/04* (2013.01)

(58) Field of Classification Search
CPC .................. C08L 23/16; C08L 2312/04; C08L 2205/035; D06N 2211/04; D06N 3/04; D06N 3/0061; D06N 3/00
See application file for complete search history.

(56) References Cited

U.S. PATENT DOCUMENTS

| | | | |
|---|---|---|---|
| 4,699,832 A | 10/1987 | Sattelmeyer | |
| 5,714,545 A * | 2/1998 | Lee | C08L 23/12 525/193 |
| 6,103,808 A * | 8/2000 | Hashimoto | C08K 5/01 208/309 |
| 6,737,478 B2 | 5/2004 | Obrecht et al. | |
| 7,396,884 B2 | 7/2008 | Achten | |
| 2008/0188600 A1* | 8/2008 | Westwood | C08L 23/16 524/275 |
| 2010/0113694 A1 | 5/2010 | Nadella et al. | |
| 2011/0126964 A1* | 6/2011 | Burrowes | B32B 9/043 156/137 |

FOREIGN PATENT DOCUMENTS

| | | |
|---|---|---|
| DE | 10 2006 003 912 A1 | 8/2007 |
| DE | 11 2013 005 123 T5 | 7/2015 |
| EP | 0 877 053 A2 | 11/1998 |
| EP | 1 449 874 B1 | 7/2008 |
| EP | 2 411 797 A1 | 4/2012 |
| EP | 2 650 327 A1 | 10/2013 |
| EP | 2 851 394 A1 | 3/2015 |
| GB | 1129288 | 10/1968 |
| WO | 2009/030529 A1 | 3/2009 |
| WO | 2017/034680 A1 | 3/2017 |

* cited by examiner

RUBBERIZED TEXTILE MATERIAL FOR A BELT PLY, ASSOCIATED RUBBER MIXTURE AND BELT

FIELD OF THE INVENTION

The invention relates to a rubberized textile material for a belt textile ply in which a textile web is at least onesidedly provided with a peroxidically crosslinkable ethylene-alpha-olefin rubber mixture and to a rubber mixture for producing the rubberized textile material and to a belt comprising at least one ply of the rubberized textile material.

BACKGROUND

Widespread ethylene-alpha-olefin rubber mixtures used for many purposes include EPM and EPDM and mixtures.

Especially EPDM mixtures and semifinished products made therefrom for belt fabrication are known for a low manufacturing tack. Manufacturing tack is to be understood as the adhesion of the not-yet-vulcanized "green" rubber mixture during processing of rubber components of a part. It is thus for example essential that certain plies adhere to one another before being subjected to further processing. For the manufacture of encapsulated parts, in particular textile-encapsulated V-belts, a manufacturing tack is indispensable at least for automated production in encapsulation apparatuses. Hand-fabrication, which can partially counter the problem, is laborious and time-consuming.

WO 2009/030529 A1 discloses adding tackifying resins to an EPDM mixture and using the thus obtained mixture as an adhesive for a textile cover ply. It is unknown what effect the resins, which are not described in detail, have on the adhesion between the textile and the belt elastomer and on important dynamic properties. However, resins generally impair strength and hardness.

DE 36 04 744 A1 describes that in the case of co-use of nitrile rubber or polyurethane rubber and curing agents synthetic rubbers may be reinforced with phenol resins. The mixture may also be employed in contact with wovens or braids while for good adhesion the additional use of adhesion promoters, for example cobalt or other metal compounds, is recommended.

U.S. Pat. No. 4,205,559 A describes a fabric rubberization made of carboxylated neoprene latex, wherein high-boiling aromatic oil is used as "tackifier".

SUMMARY

It is an object of the present invention to increase the manufacturing tack of a diene-containing ethylene-alpha-olefin mixture, in particular of an EPDM mixture, intended as a coating/rubberization for a textile ply without substantially impairing the dynamic properties of the product provided with the rubberized textile ply and the adhesion between the textile and the elastomer base body provided therewith.

DESCRIPTION

Figure 1:
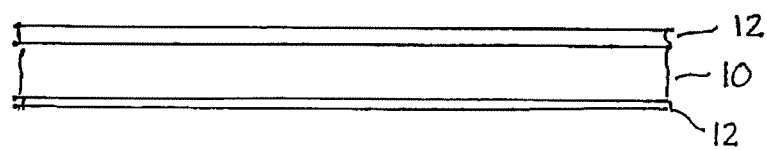
FIG. 1 shows a generalized drawing of a belt having a textile and the rubberized material of this invention.

The rubberized textile material according to the invention is suitable for use as a belt cover ply or an inner textile ply in the belt, i.e. an inner belt ply containing a textile, for a force transmission belt or a conveyor belt. For the rubberized textile material a textile web is at least onesidedly (onesidedly or bothsidedly or by uniform saturation) provided with a peroxidically crosslinkable ethylene-alpha-olefin (EAO) rubber mixture containing or consisting of an ethylene-alpha-olefin-diene terpolymer. For exemplary purposes, FIG. 1 depicts a textile web 10 provided with the rubber mixture 12 of this invention.

Figure 2A:
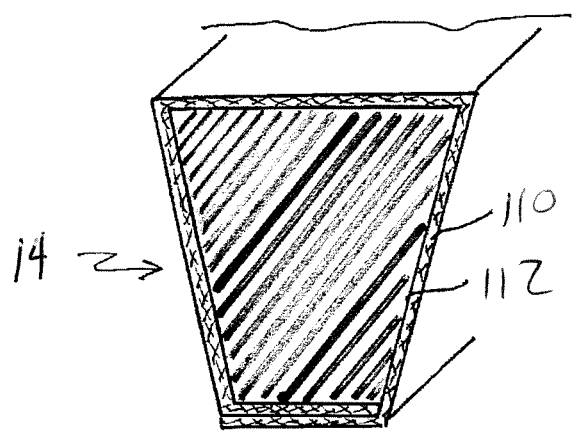
FIGS. 2a-c respectively show generalized drawings of a V-belt, toothed belt, and V-ribbed belt.
Figure 2B:
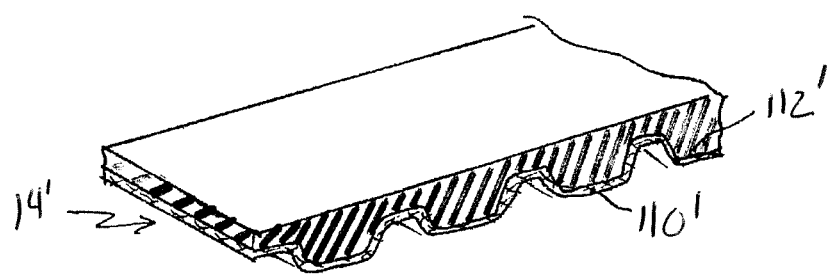
Figure 2C:
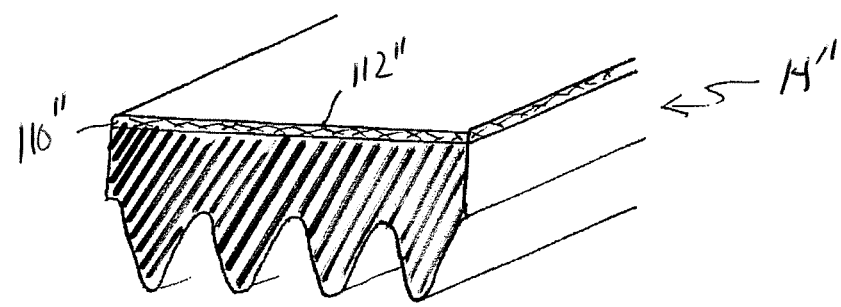

For exemplary purposes, FIGS. 2a-c depict generalized structures of belts, wherein the rubberized textile material with the rubber mixture of the present invention can be used in the manufacture of such belts and other applications.

FIG. 2a) depicts a generalized structure of a V-belt 14 with the rubberized textile (textile 110', rubber 112) wrapped around its surface.

FIG. 2b) depicts a generalized structure of a toothed belt 14' with the rubberized textile (textile 110', rubber 112') on top of the teeth.

FIG. 2c) depicts a generalized structure of a V-ribbed belt 14" wherein the rubberized textile (textile 110", rubber 112") is used for the belt backing.

For the invention any desired textile material useful or suitable for belt textiles may be used, i.e. rubberized with the EPDM mixture in the fashion according to the invention. Suitable textile forms are wovens, formed-loop knits, drawn-loop knits or nonwovens familiar to those skilled in the art also in terms of the usable qualities, textile materials and thread and/or fiber materials, thread linear densities, closenesses, weaves and areal densities.

Coating/rubberization of the textile may be carried out by all known measures. These include in particular rubberization on a calender, both in the form of covering (onesidedly or bothsidedly) or in the form of frictioning (onesidedly or bothsidedly). The term "frictioning" is to be understood as meaning calendering of fabrics where one of the calender rollers rotates faster than the other so that friction results between the fabric and the rollers (Textil-Fachworterbuch, Alois Kiessling, Max Matthes, Fachverlag Schiele & Schoen (1993)). Frictioning increases the intimate connection between the textile and the coating. Rubberization may furthermore also be undertaken inter alia by immersion or knife-coating.

The obtained rubberized or coated textiles may be subjected to further processing in customary fashion and used as belt textile cover plies or as internal textile-containing belt plies. To this end, for example, the coated (rubberized) or impregnated textile is primarily subjected to a cross-cutting process before the textile is applied to a belt winding or belt blank.

The inventive mixture for the rubberization has the feature that the ethylene-alpha-olefin rubber mixture contains or consists of an ethylene-alpha-olefin-diene terpolymer and that the rubber mixture contains a peroxidic crosslinker, a mineral oil having an aromatics proportion of at least 50 percent by weight and at least one reactive phenol and/or reactive phenol resin capable of binding to the double bonds of unsaturated polymers. The reactive phenol/phenol resin on one hand and the mineral oil on the other hand are altogether (in total) present in the mixture in a content of 5 to 60 phr, preferably in a content of 5 to 40 phr.

In preferred embodiments of the invention the diene content of the mixture is relatively high. The rubber mixture contains preferably at least 50 phr of ethylene-alpha-olefindiene terpolymer, preferably EPDM, or particularly preferably at least 70 phr of ethylene-alpha-olefin-diene terpolymer/EPDM.

The third monomer content of the ethylene-alpha-olefin-diene terpolymer, i.e. the diene content and thus the content of crosslinkable double bonds, should be relatively high and be at least 4% (monomer content in the terpolymer in mol %). When EPDM is employed as the diene-containing terpolymer it is preferable when ethylidene-norbornene (ENB) has been employed for the diene, i.e. the EPDM is preferably an ENB-based EPDM.

The ethylene-alpha-olefin-diene terpolymer or EPDM is also preferably an amorphous rubber and not a liquid elastomer.

The ethylene content of the EPDM is preferably 40-75%.

According to the invention the rubberization mixture is a peroxidically crosslinkable rubber mixture containing a content of a peroxide crosslinker. The peroxide crosslinker content is preferably 5-15 phr (parts by weight based on 100 parts by weight of the rubber constituents of the mixture). The mixture is not a mixture that is crosslinked merely or exclusively by resins in the curing during product completion.

It is a first characterizing feature of the invention that the ethylene-alpha-olefin-diene elastomer, for which EPDM is preferably selected, is crosslinked and thus cured not only peroxidically but also partly by the reactive phenol. However, an ortho-difunctional reactive phenol stabilizes the mixture even without crosslinking via a reaction to form chromane ring structures that is more particularly described hereinbelow.

The term "phenol" is to be understood as meaning phenols bearing functional groups capable of reaction with the C—C double bonds of the unsaturated polymer, i.e. bringing about a crosslinking of the diene-containing rubber mixture via the double bonds introduced by the diene comonomer and/or entering into a bond to these double bonds, preferably to form the abovementioned chromane rings. In a preferred aspect of the invention the reactive phenols comprise those having a hydroxymethyl group (methylol group) ortho to the phenolic OH group.

The reactive phenols and phenol resins employed according to the invention also react—possibly in addition to the above described crosslinking—with themselves to the extent that a certain reinforcing effect is brought about. This makes it possible to reduce the content of reinforcing fillers which generally have a less positive effect on tack and adhesion.

The definition of reactive phenols is here to be understood as also comprising phenol resins, in particular novolacs, phenol-formaldehyde resins and resorcinol-formaldehyde resins.

Without wishing to be bound to a particular theory, the particular effect of the invention appears according to current knowledge to stem from the fact that the reactive phenol and the mineral plasticizer oil that has a high aromatics fraction and is present in a relatively small amount for a plasticizer cooperate to afford good adhesion and good dynamic properties during the increase, according to the invention, of the manufactoring tack.

The tackifying effect of aromatic mineral oils is known per se but is utilized only in non-polar and saturated rubbers in the prior art. Mineral oil plasticizers are generally not used in EPDM mixtures since they are incompatible with the EPDM; the same applies to other ethylene-alpha-olefin-diene rubbers.

However, it has now been found that, surprisingly, the use of a non-excessively large amount of mineral oil having a high aromatics content (content of mononuclear or polynuclear aromatics, in particular mononuclear or dinuclear aromatics (aromatic and naphthenic rings)) in the presence of at least one reactive phenol may be incorporated into a rubber mixture having a diene content to increase tack. Adhesion and dynamic properties remain good.

The increased tack markedly simplifies the manufacturing of the particles to be produced with the rubberized textile. Due to the intrinsically higher tack of the mixture it may be possible to economize on rubberization material. This reduces the areal density of the coated or impregnated rubberized textile cover ply and makes it less stiff. The rubberization mixture furthermore exhibits an improved processability in the covering process.

The weight ratio of the aromatic mineral oil relative to the reactive phenolic constituents (phenols and/or phenol resins) is preferably 4:1 to 3:5. This is a further indication of the cooperation between the two components.

In a preferred aspect of the invention the mixture contains 5 to 40 phr of one or more coactivators selected from the group of metal acrylates, metal methacrylates, urethane acrylates, allylisocyanates, cyanurates, isocyanurates, guanidines, oximes, bismaleimides and sulfur, in each case individually or in combination.

In particularly preferred embodiments the mixture according to the invention contains at least one organometallic ionic coactivator, preferably from the group of metal acrylates and metal methacrylates and preferably in an amount of 5 to 25 phr. Suitable coactivators comprise all known coactivators of this type, such as zinc acrylate and methacrylate, magnesium acrylate and methacrylate, calcium acrylate and methacrylate, particularly preferably zinc dimethyl acrylate (ZnDMA). This does not exclude other metal(meth)acrylates which, while less common, may be equally suitable.

The metallic coactivator has the effect that vulcanizates obtained from the mixture have not only covalent, but also ionic, bond proportions. This imparts the vulcanizates with good dynamic properties, in particular under stress, a high tear strength and good adhesion. Other physical properties also go hand-in-hand with good adhesion; thus a good tear propagation resistance likewise has a positive effect on the adhesion between the textile ply and the body provided therewith in the finished vulcanized/peroxidically crosslinked product.

The rubber mixture used for the rubberization contains at least 50 phr, more preferably at least 70 phr, preferably at least 80 phr, of a diene-containing rubber, i.e. a rubber produced with a diene as a comonomer, in the rubber mixture, wherein as is customary all rubber proportions sum to 100 phr (phr=parts per hundred rubber=parts by weight per 100 parts by weight as the sum of all rubber constituents). In addition to the ethylene-alpha-olefin-diene terpolymer, preferably EPDM, the mixture may contain, preferably in minor amounts, other EAO rubbers such as in particular EPM rubbers as well as special rubbers used as additives and thermoplastic constituents with which the elastomer mixture is blended.

According to the invention the diene content in the ethylene-alpha-olefin-diene terpolymer of the rubber mixture is high as described previously. Preferred contents are from 4% to 11%, preferably from 6% to 11% and in particular from 8% to 11%. The preferred third monomer of an EPDM is ENB (ethylidene-norbornene).

According to the invention the mineral oil has an aromatics proportion of at least 50% by weight. Such plasticizer oil types are also known as aromatic plasticizer oils or aromatic mineral oils. In addition to paraffinic constituents these contain various aromatic constituents, namely mononuclear and/or polynuclear aromatics, also having annelated rings, preferably not more than dinuclear, i.e. naphthenically annelated rings. In preferred embodiments the recited mineral oils comprise 50% to 95% by weight, preferably 60% to 95% by weight and more preferably 60% to 80% by weight of aromatics.

"Reactive phenols" (including phenol resins) suitable for the invention have, as elucidated above, functional groups that "are reactive" toward C—C double bonds of the unsaturated rubber, here the diene component of the EPDM, i.e. react with these and bring about a crosslinking and thus reinforcing of the rubber or alternatively or additionally form chromane ring structures which are regarded as very heat resistant and mechanically robust. Preferred reactive phenols of this type contain reactive OH groups and/or reactive methylol groups. It is also preferable when at least some of the methylol groups of a resin or the methylol group(s) of a simple phenol are ortho to the phenol OH.

In a development of the invention the rubber mixture used for the rubberization contains the fillers carbon black and/or at least one mineral oxide, namely preferably silicon dioxide. Alternative mineral oxides used in this field as reinforcing fillers are known to those skilled in the art and therefore need not all be recited individually. These fillers are also known as "white fillers". These include not only silica but also aluminum oxides, calcium oxides, mixed oxides such as aluminosilicates etc.

It is preferable when the filler content is 5 to 60 phr, more preferably 5 to 40 phr, of a filler or filler mixture. White fillers are preferred or are employed together with carbon black, the amount of carbon black advantageously being less than or equal to the amount of white fillers (parts by weight). In a further preferred embodiment exclusively silicon dioxide is employed as the filler. This may preferably be highly dispersed/nanoscale silicon dioxide as is known and often used for rubber mixtures.

It will be appreciated by those skilled in the art that the rubber mixture for rubberization of the textile material may contain in addition to the primary constituents and additives according to the invention further additives, in particular accelerators, retarders, antiageing compounds, UV protectants, process auxiliaries, activators, dyes and more. Such customary additives therefore need not be described separately here.

To achieve the object the invention further comprises a rubber mixture for producing a rubberized textile material, i.e. a rubberization mixture, for use in drive belts or force-transmission belts or conveyor belts.

The features of the rubber mixture have all been described previously in connection with the rubberized textile material. All of these features, effects and advantages likewise apply to the rubber mixture as such.

The rubber mixture for rubberization of the textile material is appropriately adjusted in terms of its physical properties according to the chosen rubberization/coating process. Especially important here is the flowability of the as-yet-uncured composition. It is preferable when the rubber mixture is provided for processing on the textile with a Mooney viscosity of ML1+4 (100° C.) of 20 to 50 [MU].

The textile is coated or impregnated, i.e. rubberized, with the rubber mixture in an areal density of preferably not more than 1000 g/m² and more preferably not more than 500 g/m².

The physical properties reported below are suitable target properties for many applications:

a Shore A hardness of 60-90 a manufacturing tack in N/25 mm of 10 to 50 a fabric adhesion in N/25 mm of 40-150 a tear propagation resistance W-median (DIN 53507) of 4 to 10 a tear strength (in MPa) of 10-20 a 10% modulus (in MPa) of 0.5-2.5 a 50% modulus (in MPa) of 1.5-4.5

A 100% modulus (in MPa) of 3.5-4.5

The abovementioned properties may be readily adjusted by those skilled in the art with the aid of small parameter variations within the inventive and preferred quantity ranges—particularly proceeding from the examples reported hereinbelow.

To achieve the object the invention further comprises a belt comprising at least one ply of the rubberized textile material according to the invention which has been coated, covered, frictioned or impregnated with the rubber mixture according to the invention as described above. The belt according to the invention has the feature that the textile material according to the invention forms an inner textile ply in the belt or is applied to at least one side of the belt as a cover ply or envelops the belt as an encapsulation. The textile cover ply may be arranged on the back side of the belt (the belt backing or the front side) or on the force transmission side or inside of the belt (belt pulley side, compression side, side having ribs or teeth) or be arranged on both sides but with a raw edge design. Also preferred are fully encapsulated belts, in particular encapsulated V-belts.

A textile material is in turn to be understood as any possible textile type suitable for a belt cover ply as already described in detail hereinabove.

It is preferable when the belt, which may generally be a force transmission belt or a conveyor belt, is a V-belt, ribbed V-belt or toothed belt (see FIG. 2).

EXAMPLES

Example 1—for an Inventive Rubber Mixture

Amorphous EPDM having a high ENB content

| | |
|---|---|
| 48% Et, 78% ENB | 85 phr |
| Further, inter alia EPM-based, rubber constituents | 15 phr (in total) |
| Organic peroxide crosslinker | 7 phr |
| Mineral oil (aromatics content 74% by weight) | 15 phr |
| Reactive alkyl-substituted phenol resin | 5 phr |
| Silica-based filler, SiO2-175 VN3 | 12 phr |
| Furnace black N 330 | 12 phr |
| ZnDMA | 20 phr |

Further additives in parts by weight to maximum of 5 phr in each case—about 20 to 25 phr in total This first inventive example for a rubber mixture, with which a textile is rubberized in order with the thus obtained rubberized textile material to produce a belt having a rubberized textile ply, is compared to a second example for an inventive rubber mixture and a comparative example for a conventional rubberization mixture in the table which follows.

TABLE 1

(figures reported in phr)

| Mixture constituent | Comparative example | Example 1 | Example 2 |
|---|---|---|---|
| Amorphous EPDM[1) | 95 | 85 | 85 |
| Further rubber constituents | 5 | 15 | 15 |
| Paraffinic processing oil | 25 | — | — |
| Mineral oil[2) | — | 15 | 25 |
| Crosslinker[3) | 7 | 7 | 7 |
| Reactive phenol resin[4) | — | 5 | 5 |
| Silica-based filler[5) | — | 12 | — |
| Furnace black | 60 | 12 | 34 |
| ZnDMA[6) | 15 | 20 | 20 |
| Further constituents | 21.5 | 16.5 | 21.5 |
| Total phr | 228.5 | 187.5 | 212.5 |

[1)]amorphous EPDM having a high ENB content, 48% Et, 7.8% ENB
[2)]mineral oil having an aromatics content of 74%
[3)]organic peroxide crosslinker
[4)]reactive alkyl-substituted phenol resin
[5)]SiO2-175 VN3
[6)]Dynalink 634

The inventive rubber mixture made it possible to achieve a more than 5-fold increase in the manufacturing tack in terms of the force required for peeloff [N/25 mm] compared to the conventional (commercially available) EPDM rubberization mixture specified under "comparative example". Adhesion too was better in example 1 than in the comparative example. The physical and dynamic properties of the inventive examples 1 and 2 were assessed as good, inter alia 10% modulus [MPa], 50% modulus [MPa], tear strength, tear propagation resistance (W-Median according to DIN 53507) and the visually assessed coating quality.

Example 1 and Example 2 were assessed as equally good in terms of the manufacturing tack; adhesion in Example 2 was improved over Example 1.

Test Conditions for Pressure-Sensitivity/Manufacturing Tack

50 N application force for a strip made of the respective mixture onto a steel plate, 20 second hold time, peeloff rate 100 mm/min; Testing on an Eplexor 500 from Netzsch Gabo Instruments GmbH having a sample holder adapted for the strip.

The invention claimed is:

1. A rubberized textile material for a belt textile ply, comprising a textile web that is at least onesidedly provided with a peroxidically crosslinkable ethylene-alpha-olefin (EAO) rubber mixture, wherein the EAO rubber mixture is directly applied to the textile web and wherein the EAO rubber mixture comprises
    an ethylene-alpha-olefin-diene terpolymer,
    a peroxidic crosslinker,
    a mineral oil having an aromatics proportion of at least 50 percent by weight, and
    at least one reactive phenol and/or reactive phenol resin capable of binding to double bonds of unsaturated polymers, wherein the reactive phenol/phenol resin and the mineral oil are present in the rubber mixture in a content of altogether 5 to 60 parts per hundred rubber (phr).

2. The rubberized textile material as claimed in claim 1, wherein the rubber mixture contains at least 50 phr of ethylene-alpha-olefin-diene terpolymer.

3. The rubberized textile material as claimed in claim 1, wherein the diene content of the ethylene-alpha-olefin-diene terpolymer ranges from 4% to 11.

4. The rubberized textile material as claimed in claim 1, wherein the ethylene-alpha-olefin-diene terpolymer is an ethylene-propylene-diene terpolymer (EPDM).

5. The rubberized textile material as claimed in claim 1 wherein a weight ratio of the aromatic mineral oil to the reactive phenyl/phenol resin is 4:1 to 3:5.

6. The rubberized textile material as claimed in claim 1 wherein the rubber mixture contains 5 to 40 phr of one or more coactivators selected from the group consisting of acrylates, methacrylates, urethane acrylates, allylisocyanates, cyanurates, isocyanurates, guanidines, oximes, bismaleimides and sulfur, in each case individually or in combination.

7. The rubberized textile material as claimed in claim 1 wherein the rubber mixture contains 5 to 25 phr of at least one organometallic ionic coactivator selected from the group consisting of metal acrylates and methyl methacrylates.

8. The rubberized textile material of claim 7 wherein the at least one organometallic ionic coactivator is zinc dimethacrylate (ZnDMA).

9. The rubberized textile material as claimed in claim 1 wherein the mineral oil in the rubber mixture comprises 50% to 95% by weight of aromatics.

10. The rubberized textile material as claimed in claim 1 wherein the at least one reactive phenol and/or reactive phenol resin contains reactive OH groups and/or reactive methylol groups.

11. The rubberized textile material as claimed in claim 1 wherein the rubber mixture contains one or more fillers selected from one or more mineral oxides and carbon black.

12. The rubberized textile material as claimed in claim 1 wherein the rubber mixture is applied to the textile web by onesided or bothsided covering, immersion, knife-coating or frictioning.

13. A belt having at least one ply of the rubberized textile material as claimed in claim 1 wherein the rubberized textile material forms an inner textile ply or is applied to at least one side of the belt as a cover ply or envelops the belt as an encapsulation.

14. The belt as claimed in claim 13 wherein the belt is a V-belt, ribbed V-belt or toothed belt.

* * * * *